(12) United States Patent
Uno

(10) Patent No.: US 11,383,663 B2
(45) Date of Patent: Jul. 12, 2022

(54) VEHICLE CONTROL METHOD, VEHICLE CONTROL SYSTEM, VEHICLE CONTROL DEVICE, PASSENGER WATCHING-OVER METHOD, PASSENGER WATCHING-OVER SYSTEM, AND PASSENGER WATCHING-OVER DEVICE

(71) Applicant: DENSO CORPORATION, Kariya (JP)

(72) Inventor: Keiichi Uno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/131,236

(22) Filed: Dec. 22, 2020

(65) Prior Publication Data

US 2021/0107421 A1 Apr. 15, 2021

Related U.S. Application Data

(63) Continuation of application No. PCT/JP2019/018475, filed on May 9, 2019.

(30) Foreign Application Priority Data

Jun. 26, 2018 (JP) .............................. JP2018-120956

(51) Int. Cl.
*B60R 21/015* (2006.01)
*B60W 40/08* (2012.01)
*G06Q 50/30* (2012.01)

(52) U.S. Cl.
CPC .. *B60R 21/01534* (2014.10); *B60R 21/01538* (2014.10); *B60W 40/08* (2013.01); *G06Q 50/30* (2013.01)

(58) Field of Classification Search
CPC .............................. B60W 40/08; B60R 11/04
See application file for complete search history.

(56) References Cited

U.S. PATENT DOCUMENTS

| 2017/0123423 | A1* | 5/2017 | Sako | .................... G05D 1/0088 |
| 2019/0094038 | A1* | 3/2019 | Oh | .......................... G10L 15/22 |
| 2020/0016997 | A1* | 1/2020 | Sato | ......................... B60N 2/34 |
| 2021/0039596 | A1* | 2/2021 | Park | .................... G06K 9/00892 |

FOREIGN PATENT DOCUMENTS

| JP | 2004-295686 A | 10/2004 |
| JP | 2005-349898 A | 12/2005 |
| JP | 2010-149767 A | 7/2010 |
| JP | 2011-150405 A | 8/2011 |
| JP | 2013-159451 A | 8/2013 |

(Continued)

OTHER PUBLICATIONS

Keiichi Yamamoto, In-Vehicle Accident Prevention System, Jun. 20, 2016, EPO, JP 2016-107817 A, Machine Translation of Description (Year: 2016).*

*Primary Examiner* — James A English
(74) *Attorney, Agent, or Firm* — Maschoff Brennan

(57) ABSTRACT

A computer executable method for passengers boarding a vehicle includes: acquiring attribute information for each of passengers; determining a falling-down risk of each passenger individually based on the attribute information; tracking a high-risk person determined to have a high falling-down risk in a passenger compartment of the vehicle; and grasping a condition of the high-risk person individually in the passenger compartment.

14 Claims, 8 Drawing Sheets

(56) References Cited

FOREIGN PATENT DOCUMENTS

| | | | |
|---|---|---|---|
| JP | 2015-79369 A | | 4/2015 |
| JP | 2016-62414 A | | 4/2016 |
| JP | 2016-99993 A | | 5/2016 |
| JP | 2016107817 A | * | 6/2016 |
| JP | 2017-199123 A | | 11/2017 |
| JP | 2018-062197 A | | 4/2018 |
| WO | WO-2015057144 A1 | * | 4/2015 ...... B60W 30/18109 |

* cited by examiner

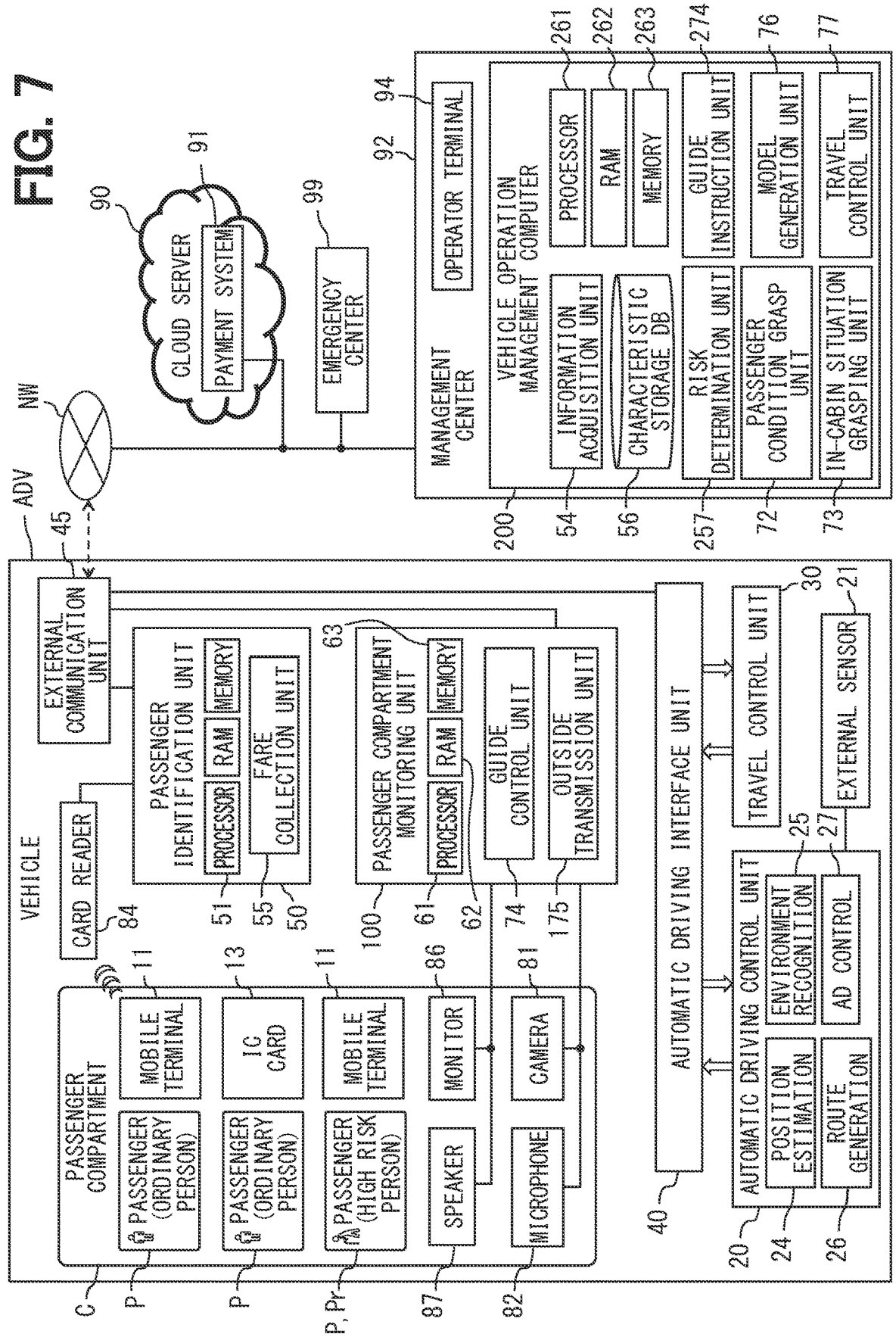

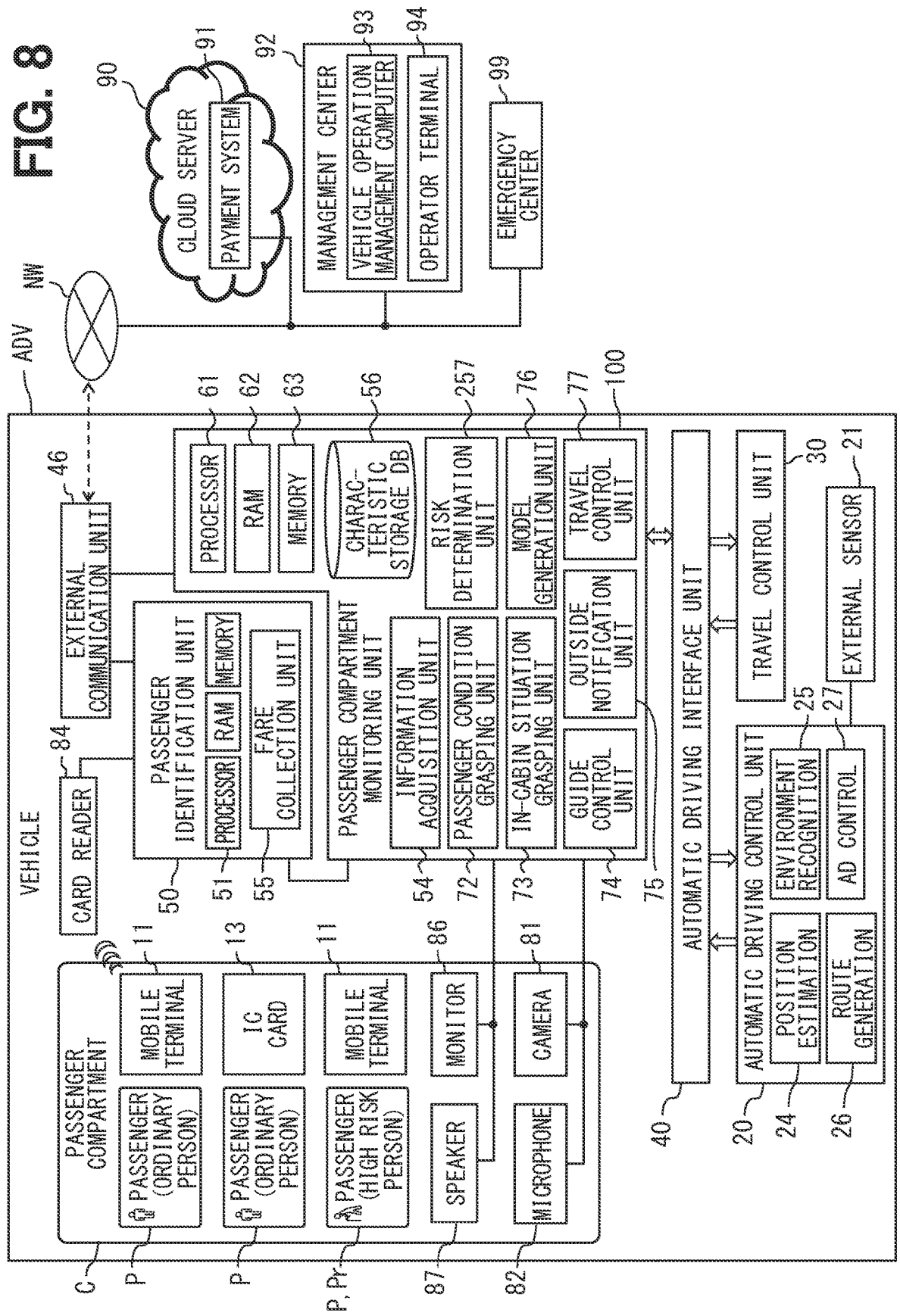

VEHICLE CONTROL METHOD, VEHICLE CONTROL SYSTEM, VEHICLE CONTROL DEVICE, PASSENGER WATCHING-OVER METHOD, PASSENGER WATCHING-OVER SYSTEM, AND PASSENGER WATCHING-OVER DEVICE

CROSS REFERENCE TO RELATED APPLICATION

The present application is a continuation application of International Patent Application No. PCT/JP2019/018475 filed on May 9, 2019, which designated the U.S. and claims the benefit of priority from Japanese Patent Application No. 2018-120956 filed on Jun. 26, 2018. The entire disclosures of all of the above applications are incorporated herein by reference.

TECHNICAL FIELD

The present disclosure relates to a control technique for controlling the traveling of a vehicle and a passenger watching-over technique.

BACKGROUND

Conventionally, for example, an in-vehicle monitoring device determines the risk of a passenger falling down based on the state information of a passenger in the vehicle and the travelling state of the vehicle, and controls a braking device and an acceleration control device according to the risk. For example, when the occupancy rate of elderly people is high and the occupancy capacity is exceeded, it is judged that the degree of danger is high in a scene where the vehicle travels on a sharp curve, and vehicle control is performed to reduce the acceleration.

SUMMARY

A computer executable method for passengers boarding a vehicle includes: acquiring attribute information for each of passengers; determining a falling-down risk of each passenger individually based on the attribute information; tracking a high-risk person determined to have a high falling-down risk in a passenger compartment of the vehicle; and grasping a condition of the high-risk person individually in the passenger compartment.

BRIEF DESCRIPTION OF THE DRAWINGS

The above and other objects, features and advantages of the present disclosure will become more apparent from the following detailed description made with reference to the accompanying drawings. In the drawings:

FIG. 7 is a block diagram showing an overall view of a system related to a passenger protect in the second embodiment; and FIG. 8 is a block diagram showing an overall image of the system according to the first modification.

DETAILED DESCRIPTION

Figure 1:
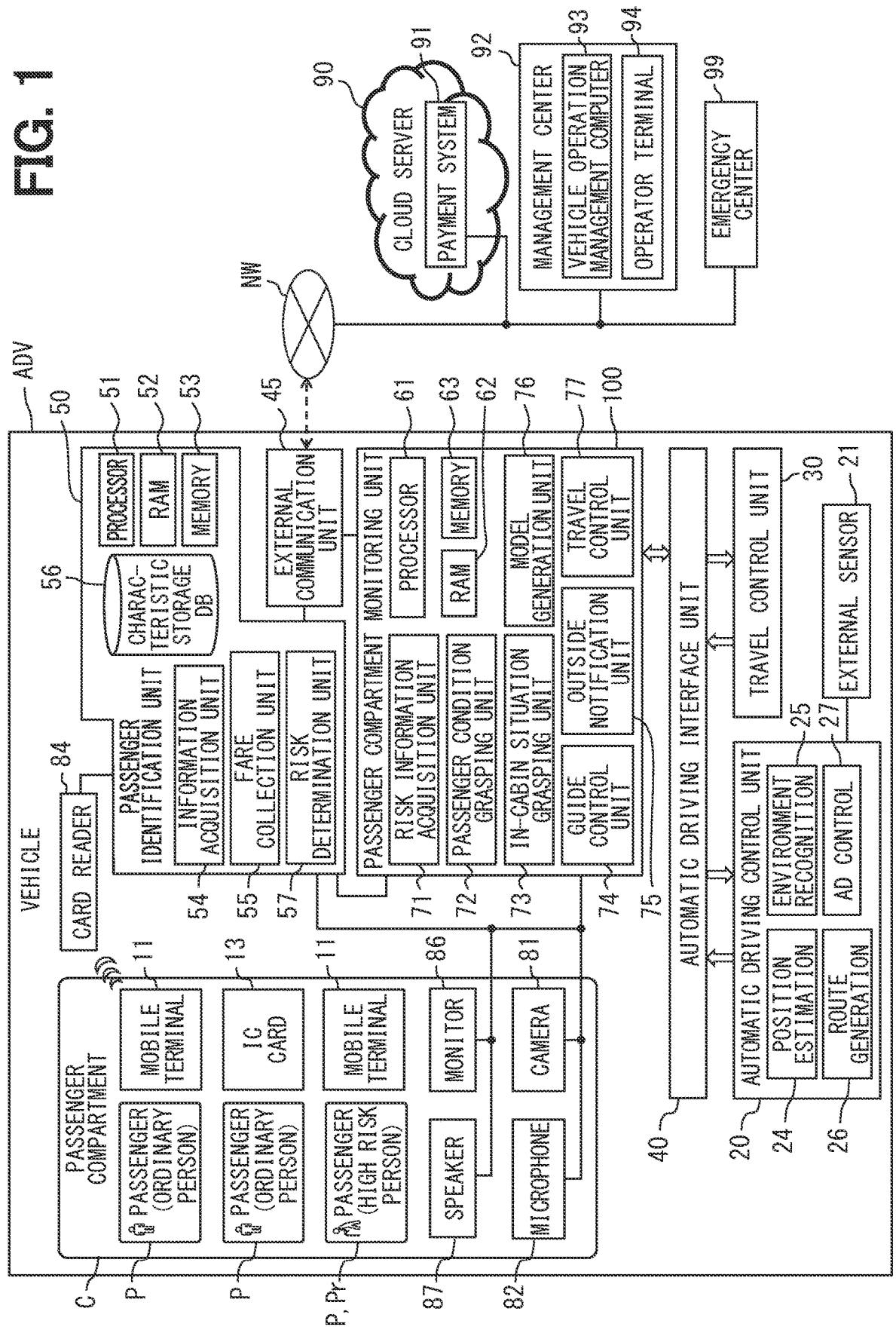
FIG. 1 is a block diagram showing an overview of a system including a passenger compartment monitoring unit according to a first embodiment of the present disclosure.

A conceivable in-vehicle monitoring device grasps information on the entire passengers such as the occupancy rate and the passenger capacity of the elderly persons, but does not grasp the state of each elderly person in the passenger compartment. Therefore, it could be assumed that an excessive driving restriction is implemented even though the actual falling-down risk is low, or a situation where the traveling restriction is not sufficient even though the falling-down risk is actually high.

In view of the above point, a vehicle control method, a vehicle control system, and a vehicle control device is provided to be capable of realizing smooth operation of a vehicle while avoiding a falling-down of a passenger having a high risk of falling down.

In the first aspect of the present embodiments, the vehicle control method implemented by a computer and controlling the travelling of the vehicle causes at least one processor to: acquire attribute information for each of the passengers getting on the vehicle; to determine the falling-down risk of each passenger based on the attribute information; monitor the passenger having the high falling-down risk determined as a high-risk passenger in a passenger compartment; grasp the condition of the high-risk passenger in the passenger compartment individually; and restrict the travelling operation of the vehicle based on the condition of each individual high-risk passenger.

In the second aspect of the present embodiments, the vehicle control system that controls the traveling of the vehicle includes: an attribute information acquisition unit that acquires attribute information for each of the passengers boarding the vehicle; a risk determination unit that individually determines the falling-down risk of each passenger based on the attribute information; a condition grasping unit that tracks the passenger having the high falling-down risk determined as the high-risk passenger in the passenger compartment and individually grasps the condition of the high-risk passenger in the passenger compartment; and a travel restriction unit that restricts the travel of the vehicle based on the condition of each high-risk passenger.

In the third aspect of the present embodiments, the vehicle control device mounted on the vehicle and controlling the running of the vehicle includes: a risk information acquisition unit that acquires a determination result of individually determining the falling-down risk of the passengers getting in the vehicle; a condition grasping unit that tracks the passenger having the high falling-down risk determined as the high-risk passenger in the passenger compartment and individually grasps the condition of the high-risk passenger in the passenger compartment; and a travel restriction unit that restricts the travel of the vehicle based on the condition of each high-risk passenger.

In these aspects, the fall risk of each passenger is determined based on the attribute information of each passenger boarding the vehicle. Then, a high-risk passenger with a high risk of falling down is individually grasped of the condition in the passenger compartment. Therefore, the travel restriction of the vehicle can be appropriately controlled according to the actual fall risk of the high-risk passenger on board. Based on the above, smooth operation of the vehicle is realized while avoiding the fall of passengers with a high risk of falling.

Hereinafter, multiple embodiments of the present disclosure will be described with reference to the drawings. Incidentally, the same reference numerals are assigned to corresponding components in each embodiment, and therefore duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. It should be understood that the unexplained combinations of the structural components recited in the following embodiments and modifications thereof are assumed to be disclosed in this description by the following explanation.

First Embodiment

Figure 2:
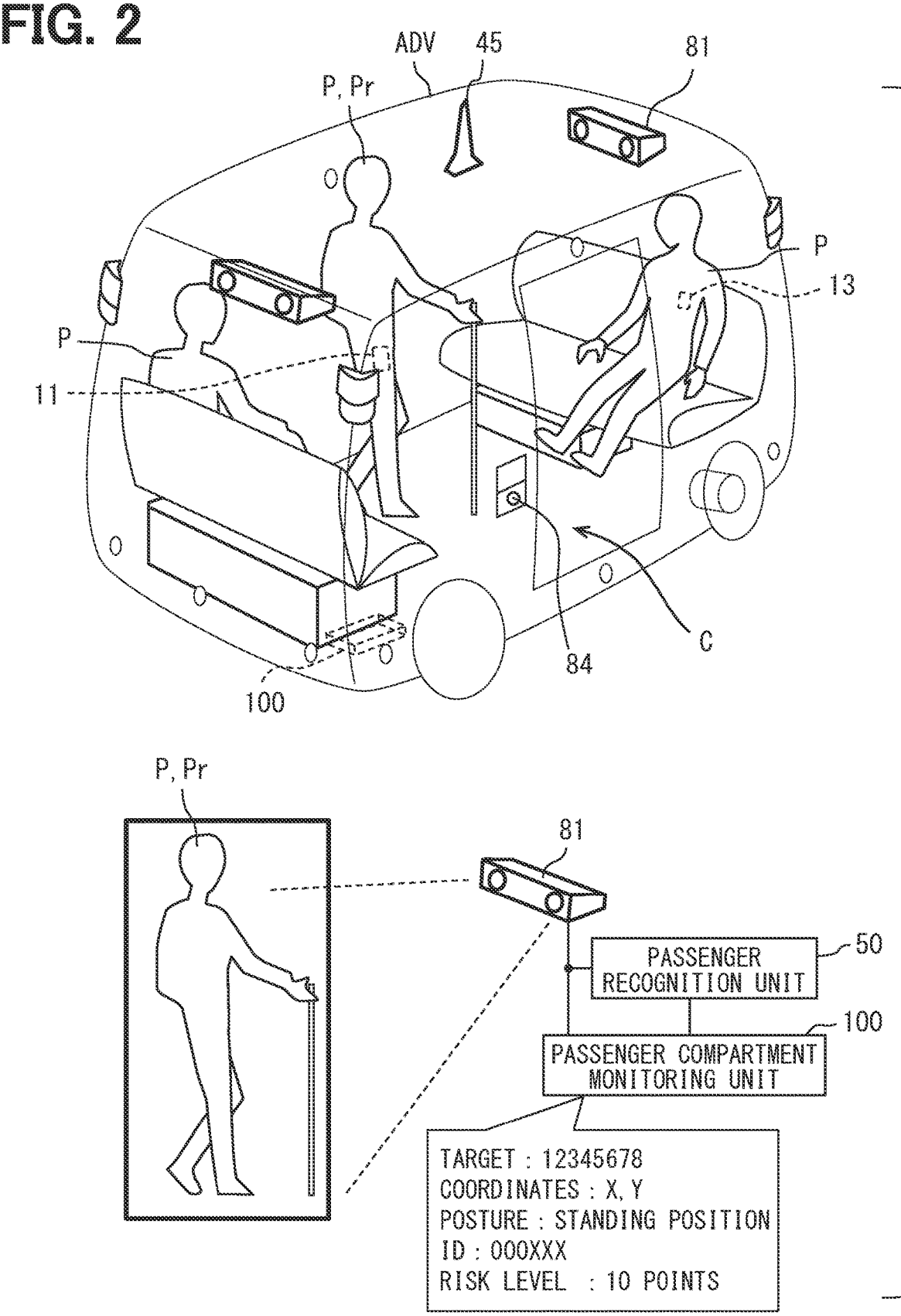
FIG. 2 is a diagram illustrating a scene in which a high-risk passenger is guided to a vacant seat.

The function of the vehicular control device according to the first embodiment of the present disclosure is realized by the passenger compartment monitoring unit 100 shown in FIG. 1. The passenger compartment monitoring unit 100 is one of a plurality of in-vehicle computers mounted on the vehicle ADV. The vehicle ADV shown in FIGS. 1 and 2 is an automatic driving bus that can autonomously travel without a driver's driving operation, and is a connected car that can communicate with a communication network NW outside the vehicle. The vehicle ADV includes, for example, a passenger compartment C in which a predetermined numerical number of passengers P (for example, several passengers to several tens passengers) can board. In the passenger compartment C, a large number of seats for the passengers P are installed as passenger seats.

The vehicle ADV is equipped with an external sensor 21, an automatic driving control unit 20, a traveling control unit 30, an automatic driving interface unit 40, and the like as a configuration for realizing autonomous driving. In addition, the vehicle ADV includes an in-vehicle camera 81, a microphone 82, a card reader 84, a monitor 86, a speaker 87, an external communication device 45, a passenger identification unit 50, and the like as a configuration for the passenger P boarding the passenger compartment C together with the passenger compartment monitoring unit 100.

The vehicle external sensor 21 is configured to acquire information necessary for autonomous driving. The vehicle external sensor 21 includes, for example, a camera unit, a rider unit, a millimeter wave radar unit, and the like, as well as a GNSS (Global Navigation Satellite System) receiver and the like combined with a map database. The camera unit, the rider unit, and the millimeter-wave radar unit detect moving objects such as pedestrians and other vehicles, and stationary objects such as traffic signals, road signs, and lane markings. The GNSS receiver receives positioning signals transmitted from a plurality of artificial satellites as information for specifying the current position of the vehicle ADV.

The automatic driving control unit 20 is electrically connected to the automatic driving interface unit 40. The automatic driving control unit 20 acquires state information indicating the state of the vehicle ADV from the automatic driving interface unit 40. The automatic driving control unit 20 is an in-vehicle computer mainly including a control circuit having a processor, a RAM, a memory device, and an input/output interface. The automatic driving control unit 20 executes an autonomous driving program stored in the memory device by a processor, and implements functional units such as a position estimation unit 24, an environment recognition unit 25, a route generation unit 26, and an autonomous driving control unit 27.

The position estimation unit 24 estimates the current position of the vehicle ADV with high accuracy based on the positioning signal and the detection information acquired from the external sensor 21. The environment recognition unit 25 combines the position information specified by the position estimation unit 24, the map data acquired from the map database based on the position information, and the detection information of the camera unit and the like to obtain the driving environment around the vehicle ADV and to recognize obstacles around the vehicle ADV. The environment recognition unit 25 creates a virtual space that reproduces the traveling environment around the vehicle ADV based on the recognition result around the vehicle ADV.

The route generation unit 26 generates a travel plan for autonomously driving the vehicle ADV based on the travel environment recognized by the environment recognition unit 25 and the condition information of the vehicle ADV acquired from the automatic driving interface unit 40. Based on the travel plan generated by the route generation unit 26, the autonomous driving control unit 27 calculates each control amount of driving, braking, and steering that realizes traveling according to the traveling plan. The autonomous driving control unit 27 generates a control command instructing each control amount and sequentially outputs the control command to the automatic driving interface unit 40.

The travel control unit 30 is directly or indirectly electrically connected to the in-vehicle sensor group and the in-vehicle actuator group mounted on the vehicle ADV. The in-vehicle sensor group is a plurality of sensors that detect the state of the vehicle ADV. The in-vehicle sensor group includes, for example, a vehicle speed sensor, an acceleration sensor, a yaw rate sensor, and the like. The in-vehicle actuator group executes acceleration/deceleration control, operation control, and the like of the vehicle ADV. The in-vehicle actuator group includes motors for driving motor generators for drive and regeneration, brake actuators, and steering actuators.

The travel control unit 30 is an in-vehicle computer mainly including a control circuit having a processor, a RAM, a memory device, and an input/output interface. The travel control unit 30 is electrically connected to the automatic driving interface unit 40. The travel control unit 30 sequentially provides the status information of the vehicle ADV based on the output of the in-vehicle sensor group to the automatic driving interface unit 40. The travel control unit 30 acquires control commands such as driving, braking, and steering from the automatic driving control unit 20. The travel control unit 30 operates an in-vehicle actuator group based on the acquired control command to perform autonomous driving based on the travel plan.

The automatic driving interface unit 40 is an in-vehicle computer mainly including a control circuit having a processor, a RAM, a memory device, and an input/output interface. The automatic driving interface unit 40 is interposed between the automatic driving control unit 20 and the traveling control unit 30, and manages the autonomous driving of the vehicle ADV in an integrated manner. The automatic driving interface unit 40 provides the status information of the vehicle ADV acquired from the travel control unit 30 to the automatic driving control unit 20, and outputs the control commands of the travel control unit 30 based on a control command acquired from the automatic driving control unit 20.

The automatic driving interface unit 40 is electrically connected to the passenger compartment monitoring unit 100 and the external communication device 45. The automatic driving interface unit 40 acquires a travel restriction command reflecting the condition of the passenger P boarding the passenger compartment C from the passenger compartment monitoring unit 100. In addition, the automatic driving interface unit 40 also acquires a travel restriction command from the management center 92 (described later) through the external communication device 45. Based on these travel restriction commands, the automatic operation interface unit 40 adjusts the control commands to be output to the travel control unit 30 with respect to the control commands acquired from the automatic driving control unit 20.

The passenger compartment camera 81 and the microphone 82 are sensors for grasping the situation of the passenger P in the passenger compartment C, and are installed in a plurality of sets on the ceiling of the passenger compartment C, for example. The passenger compartment camera 81 photographs the passenger compartment C and the passenger P, and sequentially outputs the generated passenger compartment image to the passenger identification unit 50 and the passenger compartment monitoring unit 100. The camera 81 is combined with a wide-angle lens, and is disposed in a passenger compartment at a position where the camera 81 has no blind spot. The camera 81 may have a configuration capable of detecting light in the near infrared region in addition to light in the visible light region, or may be combined with a laser scanner or the like. The microphone 82 sequentially outputs the passenger compartment sound which includes the sound of the passenger compartment C detected toward the passenger compartment monitoring unit 100.

The card reader 84 is installed, for example, near the doorway of the passenger compartment C. The card reader 84 may be installed in the passenger compartment or outside the vehicle body. The card reader 84 is a device capable of near field communication (i.e., NFC) between the transportation IC card 13 and the mobile terminals 11 having the card function. To ensure that the IC card 13 or the mobile terminal 11 is touched on the card reader 84, a voice message such as "Please touch the card on the reader" is reproduced by the speaker 87 at the timing when the passenger P boards the passenger compartment C. Furthermore, when the reading is completed, a voice message such as "Completed. Thank you." is reproduced.

Figure 3:
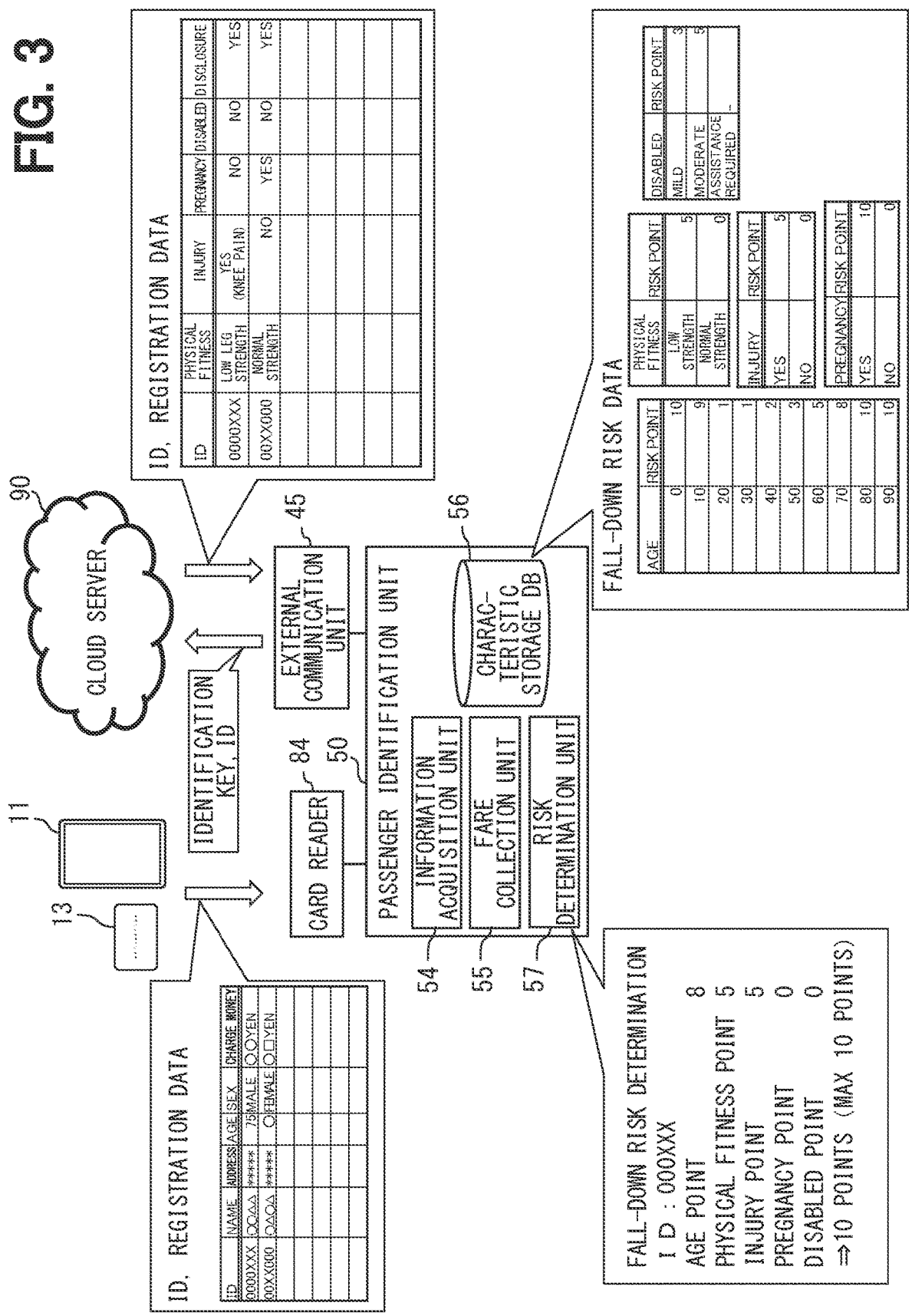
FIG. 3 is a diagram showing an example of a method for determining a falling-down risk.

The card reader 84 receives unique identification information (hereinafter, "ID") from the IC card 13 and the mobile terminal 11. In addition, the card reader 84 can receive the registration data of the passenger P stored in the IC card 13 and the mobile terminal 11 (see FIG. 3). The card reader 84 provides the received ID and registration data to the passenger identification unit 50.

The monitor 86 and the speaker 87 are installed in the passenger compartment and present information to the passenger P in the passenger compartment C. The monitor 86 is, for example, a liquid crystal display or the like, and displays advertisements, news, operation information of the vehicle ADV, attention information, etc. on the screen. The speaker 87 reproduces a voice message for the passenger P in the passenger compartment.

The external communication device 45 can wirelessly communicate with the external communication network NW outside the vehicle. The communication network NW is connected to a payment system 91 built on a cloud server 90 or the like, a management center 92 that manages the operation of a large number of vehicles ADV, and a system of an emergency organization such as a hospital (hereinafter, "emergency center 99"). The operation management computer 93, an operator terminal 94, and the like are installed in the management center 92. The external communication device 45 transmits and receives information to and from the payment system 91, the management center 92, and the emergency center 99.

The passenger identification unit 50 is an in-vehicle computer having a function of personally authenticating the passenger P when boarding the vehicle ADV and a function of determining the characteristics of each passenger P. The passenger identification unit 50 mainly includes a control circuit having a processor 51, a RAM 52, a memory device 53, and an input/output interface. The processor 51 is hardware for arithmetic processing and connected to the RAM 52, and can execute various programs. The memory device 53 includes a non-volatile storage medium, and stores various programs to be executed by the processor 51. The program stored in the memory device 53 includes at least an authentication program that causes the passenger identification unit 50 to perform identification and characteristic determination of the passenger P. By executing the authentication program by the processor 51, the passenger identification unit 50 is equipped with functional units such as the attribute information acquisition unit 54, the fare collection unit 55, the characteristic storage database 56, and the risk determination unit 57 shown in FIGS. 1 and 3.

The attribute information acquisition unit 54 acquires the ID and registration data read by the card reader 84. The registration data that can be acquired from the mobile terminal 11 or the IC card 13 includes, for example, the owner's name, address, age, gender, charge amount (i.e., balance), and the like. The attribute information acquisition unit 54 may acquire the registration data of the passenger P associated with the ID from the cloud server 90. The registered data that is acquired from the cloud server 90 includes, for example, information whether or not there is a decrease in physical fitness, the type of illness under treatment, the information whether or not there is pregnancy, the information whether or not there is a disability, and the information whether or not such information can be disclosed. These registration data may be stored in advance in the mobile terminal 11 or the IC card 13. The attribute information acquisition unit 54 acquires a plurality of items related to the falling-down risk in the registered data as attribute information for each passenger P boarding the vehicle ADV.

The attribute information acquisition unit 54 may be able to acquire the attribute information by another method. For example, the attribute information acquisition unit 54 may analyze the passenger compartment image by the in-vehicle camera 81 or the front image by the camera unit of the external sensor 21 and acquire the attribute information by image recognition. The attribute information such as age, gender, physical characteristics, and smoothness of physical movement can be acquired from the passenger compartment image and the front image.

As another method, the attribute information acquisition unit 54 may acquire the record of unsafe behavior and falls that occurred during the past boarding opportunity as attribute information. In addition, the attribute information acquisition unit 54 may acquire the record of unsafe behavior and falls that occurred when boarding another means of transportation as attribute information. These attribute information may be uploaded to the cloud server 90 in a state of being associated with the ID, for example, and may be repeatedly acquired at the time of subsequent boarding, and stored in a state of being associated with the ID in the characteristic storage database 56 of each vehicle ADV to be used repeatedly.

The fare collection unit 55 transmits the identification key and the ID to the payment system 91 on the cloud server 90, and realizes real-time payment of the usage fee of the vehicle ADV (as a mobility service).

The characteristic storage database 56 stores at least data used for determining the fall risk (hereinafter, "fall risk data"). The fall risk data is a table (or a map, etc.) that converts the contents of each item that can be acquired as attribute information into risk values. The characteristic storage database 56 stores a table for converting the age of passenger P, deterioration of physical fitness, presence/absence of illness during treatment, presence/absence of pregnancy, presence/absence of disability, etc. into risk values.

The risk determination unit 57 individually determines the fall risk of each passenger P at the timing of boarding the vehicle ADV based on the attribute information acquired by the attribute information acquisition unit 54. The risk determination unit 57 quantifies the attribute information acquired by the attribute information acquisition unit 54 using the fall risk data read from the characteristic storage database 56, and determines the risk of each passenger P. As an example, the maximum risk is defined as 10 points, and it is accumulated for each item in the form of 8 points depending on age, 5 points due to deterioration of physical fitness, 5 points due to hospital visits, and so on. The risk determination unit 57 sequentially provides the fall risk of each passenger P determined using the fall risk data to the passenger compartment monitoring unit 100, together with the ID and attribute information such as age and gender.

The passenger compartment monitoring unit 100 is an in-vehicle computer that protects the passenger P who is disposed in the passenger compartment C and controls the autonomous driving of the vehicle ADV. The function of the passenger compartment monitoring unit 100 replaces the role of the driver in the manned vehicle. The passenger compartment monitoring unit 100 grasps the condition of the passenger P (hereinafter, "high risk person Pr") having a high risk of falling-down, and implements travel restrictions so as not to cause a fall. In addition, the passenger compartment monitoring unit 100 can also handle the occurrence of a falling-down.

In order to realize such a monitoring and protecting function, the passenger compartment monitoring unit 100 includes mainly a control circuit having a processor 61, a RAM 62, a memory device 63, and an input/output interface. The processor 61 is hardware for arithmetic processing and connected to the RAM 62, and can execute various programs. The memory device 63 includes a non-volatile storage medium, and stores various programs to be executed by the processor 61. The program stored in the memory device 63 includes at least a vehicle control program that causes the passenger compartment monitoring unit 100 to perform vehicle control based on passenger compartment monitoring results. By executing the vehicle control program by the processor 61, the passenger compartment monitoring unit 100 provides functional units such as a risk information acquisition unit 71, a passenger condition grasping unit 72, a passenger compartment situation grasping unit 73, a guidance control unit 74, an outside notification unit 75, a model generation unit 76, and the travel restriction unit 77.

The risk information acquisition unit 71 acquires the risk, the ID, the attribute information, etc. of each passenger P from the risk determination unit 57. The risk information acquisition unit 71 refers to the ID reading timing, attribute information, and the like, and associates the fall risk with each passenger P detected from the passenger compartment image. The risk information acquisition unit 71 categorizes each passenger P into groups according to the fall risk. Specifically, the risk information acquisition unit 71 classifies the passengers P boarding the passenger compartment C into a high-risk person Pr (for example, having a fall risk of 5 or more) determined to have a high falling-down risk and other passengers P (for example, as an ordinary person having a fall risk of 4 or less).

The passenger condition grasping unit 72 follows the high-risk person Pr selected by the risk information acquisition unit 71 in the passenger compartment. The passenger condition grasping unit 72 individually continues grasping the condition of each passenger P including the high-risk person Pr in the passenger compartment from getting-on to getting-off by analyzing the passenger compartment image and the passenger compartment sound during the operation period of the vehicle ADV. Specifically, the passenger condition grasping unit 72 continuously monitors the posture of each passenger P and behaviors of each passenger P such as movement (or a position), sitting and leaving in the passenger compartment, and determines whether a high-risk person is in a standing state (i.e., standing position). Further, the passenger state grasping unit 72 detects the grip of the strap, the grip bar, and the like by the high-risk person Pr, and determines whether or not the vehicle is in a state of not moving any more.

Further, the passenger condition grasping unit 72 can detect an accident of the passenger P based on the passenger compartment image, detect an incident based on the passenger compartment sound, and detect an incident by a report of other passengers P. Specifically, the passenger condition grasping unit 72 detects a state in which the passenger P has fallen on the floor, a state in which the passenger P sits on the floor, a state in which the body of the passenger P is greatly tilted sideways, and the like as accident or abnormalities.

The passenger compartment situation grasping unit 73 grasps the situation of the passenger compartment C based on the analysis of the passenger compartment image. Specifically, the passenger compartment situation grasping unit 73 extracts vacant seats in which another passenger P (i.e., an ordinary person) is not seated among the plurality of passenger seats installed in the passenger compartment C, and grasps the presence or absence of vacant seats. For grasping the situation of the passenger compartment C, for example, detection information of a distance measuring sensor such as an ultrasonic sensor and a rider, a pressure sensor installed in each seat, and a seatbelt switch may be used. Further, the passenger compartment situation grasping unit 73 extracts a portion of a plurality of passenger seats which is occupied by luggage or the like.

The guidance control unit 74 controls the guidance directed to the passengers P including the high-risk person Pr so that the vehicle ADV can start and stop running while the high-risk person Pr is seated in the passenger seat in order to reduce the falling-down risk of the high-risk person Pr. Specifically, the guidance control unit 74 guides the high-risk person Pr selected by the risk information acquisition unit 71 to a vacant seat. For guidance to vacant seats, voice guidance using the speaker 87, optical guidance by a light emitting device arranged in the passenger compartment C, message notification to the mobile terminal 11 of each passenger P, and the like may be used.

The guidance control unit 74 provides a notification that reduces the risk of falling in the passenger compartment. For example, when a high-risk person Pr gets into the passenger compartment C at a predetermined stop such as a bus stop, the high-risk person Pr is guided to a vacant seat extracted by the passenger compartment situation grasping unit 73 (see FIG. 2). In this case, a voice message such as "There are vacant seats in the direction of travel. Please take a seat for safety. There is enough time before departure." is reproduced by the speaker 87. The guidance control unit 74 monitors the movement of the high-risk person Pr and the seating in the vacant seat, and notifies the other passengers P of the state of waiting for seating by using a predetermined voice message while moving to the vacant seat. According to these announcements, seats near the high-risk person Pr may be handed over and movement to vacant seats may be minimized.

In addition, the guidance control unit 74 can change the notification according to the vacancy status of the passenger compartment C. When there is no vacant seat, the guidance control unit 74 encourages the passenger P seated in the priority seat so as to give up the predetermined priority seat via a predetermined announcement. Further, when the passenger seat is occupied by the luggage, the guidance control unit 74 encourages the passenger P so as to move the luggage from the passenger seat. In this case, for example, a voice message such as "Please put your luggage on the rack or on your lap so that as many people as possible can sit. Please give your seat to the priority customer. Thank you for your cooperation." is reproduced by the speaker 87. Then, when the priority seat is given up, the guidance control unit 74 guides the high-risk person Pr to the given-up priority seat.

Here, since the high-risk person Pr takes much time to move in the passenger compartment, he or she tends to leave his or her seat early and to start moving before decelerating or stopping at a bus stop or the like so as not to bother the surrounding passengers P. Therefore, the guidance control unit 74 guides the high-risk person Pr so as to maintain the seated state until the vehicle is completely stopped in the period before the stop and before the vehicle ADV decelerates. Even so, for high-risk people Pr who are trying to stand up from the passenger seats, a voice message such as "Please do not stand up until the vehicle is completely stopped. There is plenty of stoppage time." is noticed again.

The external notification unit 75 notifies the management center 92 of the status of the passenger compartment C when the passenger condition grasping unit 72 detects an abnormality or accident of the passenger P. The notification function to the management center 92 by the external notification unit 75 provides two-step management that is a combination of the system determination by the passenger compartment monitoring unit 100 and the manned determination by the operator of the management center 92.

The external notification unit 75 transmits to the operator terminal 94 a passenger compartment image, a passenger compartment sound, etc., which captures the falling-down situation of the passenger P (i.e., the high-risk person Pr). In addition, the external notification unit 75 connects the communication line between the passenger compartment C and the management center 92. Further, in the management center 92, the operator can make a report to the emergency center 99, change the destination to a hospital or the like, arrange another vehicle for carrying another passenger P, and the like. The notification to the emergency center 99 may be automatically performed by the external notification unit 75.

The model generation unit 76 analyzes the posture of the high-risk person Pr when there is a standing high-risk person Pr, and determines the current dynamic fall risk. Specifically, the model generation unit 76 models the high-risk person Pr in a standing state, and estimates the degree of high-risk person Pr swaying according to the rolling of the vehicle ADV, that is, the change in the weight center. The model generation unit 76 determines whether or not the projected position at which the weight center of the body of the high-risk person Pr is projected perpendicularly to the floor surface is disposed within the space between both feet of the person Pr. When the projected position is between both feet, the model generation unit 76 determines that the person Pr has a low risk posture with a low dynamic fall risk. On the other hand, when the projected position is out of the space between both feet, the model generation unit 76 determines that the person Pr has a high-risk posture with a high dynamic fall risk. The model generation unit 76 provides the travel restriction unit 77 with dynamic fall risk information based on the projected position of the weight center, and utilizes for travel restriction to prevent the falling-down.

The traveling restriction unit 77 restricts the autonomous driving operation of the vehicle ADV by outputting a travel restriction command toward the automatic driving interface unit 40. The travel restriction unit 77 continuously outputs a travel restriction command for waiting for the vehicle ADV to start during the boarding period at a stop or the like until the high-risk person Pr is seated. Then, based on the high-risk person Pr sitting in the passenger seat, the traveling restriction unit 77 outputs a command for permitting the start to the automatic driving interface unit 40.

In a scene where some high-risk people Pr cannot be seated, the traveling restriction unit 77 outputs a start permission command to the automatic driving interface unit 40 based on the determination result of the completion of movement by the passenger condition grasping unit 72. In this case, the travel restriction unit 77 performs travel restriction that allows driving, braking, and steering to the extent that the high-risk person Pr does not fall, based on the state of each high-risk person Pr.

More specifically, the traveling restriction unit 77 reduces the acceleration/deceleration and steering angular velocity generated by the traveling of the vehicle ADV according to the output of the traveling restriction command toward the automatic driving interface unit 40, as compared with the normal operation time of traveling based on the control command. In the normal case, there is no high-risk person Pr in a standing state. Based on the dynamic fall risk information acquired from the model generation unit 76, the travel restriction unit 77 restricts each control amount of driving operations, braking operations, and steering operations so that the posture of the high-risk person Pr does not become a high-risk posture due to a change in the weight center attributed to vehicle behavior. In addition, the traveling restriction unit 77 increases the degree of restriction of each control amount when there is a high-risk person Pr in a high-risk posture based on the fall risk information, as compared with the case where there is only a high-risk person Pr in a low-risk posture.

Figure 4:
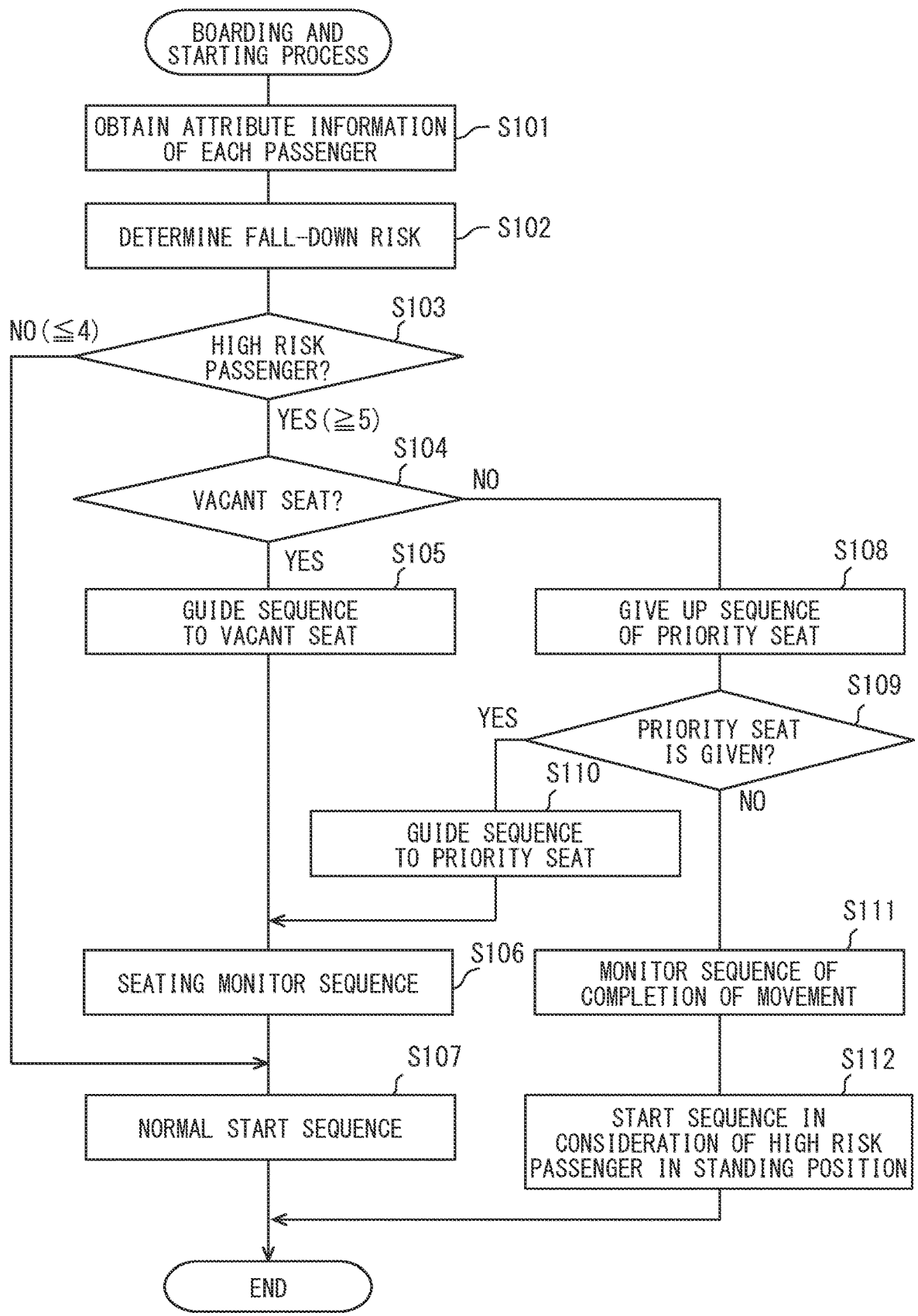
FIG. 4 is a flowchart showing a detail of a boarding and starting process performed by a passenger authentication unit and a passenger compartment monitoring unit.

The details of the boarding and starting process, the deceleration and stopping process, and the emergency treatment process performed by the passenger compartment monitoring unit 100 will be described with reference to FIG. 1 and the like based on FIGS. 4 to 6. The boarding and starting process shown in FIG. 4 starts when the vehicle stops at a specific stop such as a bus stop.

In S101 of the boarding and starting process, the attribute information of each passenger P who is boarding the vehicle ADV in an order is acquired from the mobile terminal 11, the IC card 13, the cloud server 90, and the like, and proceeds to S102. In S102, the fall risk for each passenger P is individually determined based on the attribute information acquired in S101. Then, by associating the fall risk with each passenger P, the high-risk person Pr is selected and the process proceeds to S103.

In S103, the presence or absence of the high-risk person Pr is determined with reference to the determination result of S102. When the fall risk of all passengers P is 4 or less, in S103, it is determined that there is no high-risk person Pr, and the process proceeds to S107. In S107, a voice message such as "Everyone takes a seat, so the vehicle ADV starts travelling." is reproduced through the speaker 87, and a command to allow the start is output to the automatic driving interface unit 40. As a result, a normal start sequence based on the control of the automatic driving control unit 20 is carried out.

On the other hand, when it is determined in S103 that there is a high-risk person Pr, the process proceeds to S104. In S104, the situation of the passenger compartment C is grasped, and the presence or absence of vacant seats is determined. When it is determined in S104 that there is a vacant seat, the process proceeds to S105. In S105, the guidance sequence to the vacant seat is performed, and the process proceeds to S106. In the guidance sequence, a high-risk person Pr is guided to the vacant seat extracted in S104 by using a voice message or the like. When the boarding of the high-risk person Pr is assumed in advance, guidance for giving up the passenger seat near the entrance, which makes it easy for the high-risk person Pr to get on and off, may be performed in advance for the other passengers P.

In S106, a monitoring sequence for monitoring whether or not the high-risk person Pr is seated in the passenger seat which is the destination of the guidance in S105 or the passenger seat which is transferred by the other passenger P is performed, and the process proceeds to S107. Then, after waiting for the high-risk person Pr to complete seating, a normal starting sequence based on the control of the automatic driving control unit 20 is executed.

When it is determined in S104 that there is no vacant seat, the process proceeds to S108. In S108, in the priority seat release sequence, the giving up of the priority seat or the passenger seat on which the luggage is placed is promoted to the other passengers P, and the process proceeds to S109. In S109, it is determined whether or not the priority seat or the passenger seat has been left vacant as a result of the promotion at S108. When it is determined in S109 that the priority seat and the like have been left empty, the process proceeds to S110. In S110, a guidance sequence to the priority seat is carried out, and the high-risk person Pr is guided to the released priority seat. Then, each sequence of S106 and S107 is carried out in order.

On the other hand, when it is determined in S109 that the priority seat and the like are not released, the process proceeds to S111. When it is determined in S104 that high-risk persons Pr are seated in all priority seats, respectively, and there are no seats occupied by luggage, steps S108 and S109 may be skipped and the process may be shifted to S111. In S111, the movement completion monitoring sequence is executed, and the process proceeds to S112. In the movement completion monitoring sequence, the high-risk person Pr is tracked in the passenger compartment, and the situation of the high-risk person Pr in the passenger compartment is grasped to monitor the completion of the movement. In S112, the start permission under the condition that there is a high-risk person Pr in a standing state is output to the automatic driving interface unit 40. In such a starting sequence, the running state of the vehicle ADV is restricted based on the condition of each high-risk person Pr, and the running of the vehicle ADV is started with a slower starting acceleration than the normal starting sequence.

Figure 5:
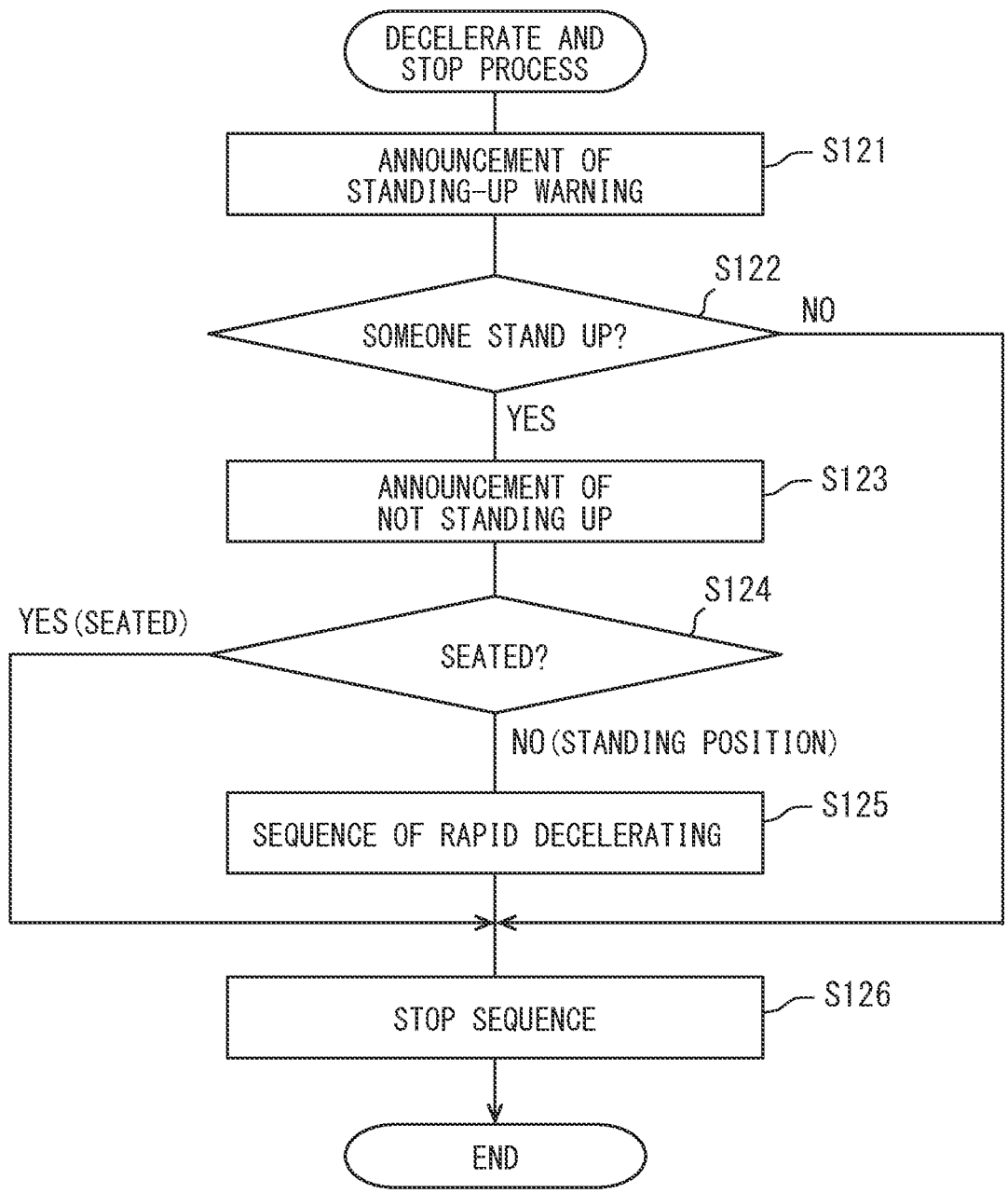
FIG. 5 is a flowchart showing a detail of a deceleration and stop process performed by the passenger compartment monitoring unit.

The deceleration and stop process shown in FIG. 5 is started in a period before deceleration for stopping, based on the condition that the remaining distance to the stop or the like is less than a predetermined distance.

In S121, the passenger P is warned not to stand up before the bus stop or the like. Specifically, an announcement for preventing the standing-up of the passenger P is made using the monitor 86 and the speaker 87, and the process proceeds to S122.

In S122, it is determined whether or not the passenger P stands up by detecting the passenger P who is standing up from the passenger seat. When it is determined in S122 that the passenger P does not stand up, the process proceeds to S126. In S126, a command for permitting normal deceleration is output to the automatic driving interface unit 40. As a result, a normal stop sequence based on the control of the automatic driving control unit 20 is carried out.

On the other hand, when the passenger P standing up from the passenger seat is detected in S122, the process proceeds to S123. In S123, an announcement is made to guide the passenger not to stand up until the vehicle stops, the passenger P being standing up is urged to take a seat, and the process proceeds to S124.

In S124, it is determined whether or not all the high-risk persons Pr are in a seated state. When it is determined in S124 that all the high-risk persons Pr are seated, the process proceeds to S126 and the normal stop sequence is performed.

On the other hand, when it is determined in S124 that there is a high-risk person Pr in a standing state, the process proceeds to S125. In S125, an early deceleration sequence is performed, and the process proceeds to S126. In the early deceleration sequence, the timing of starting braking for stopping is earlier than when there is no high-risk person Pr in the standing state. Then, in the stop sequence of S126, the braking force of the vehicle ADV is limited to a deceleration of about a half of the normal stop sequence. Similarly, the maximum allowable steering angular velocity is set to a value lower than the normal stop sequence, as is the deceleration. In the stop sequence, the body swaying due to deceleration may be observed, and the deceleration may be adjusted in real time so that the projected position of the weight center falls between both feet.

Figure 6:
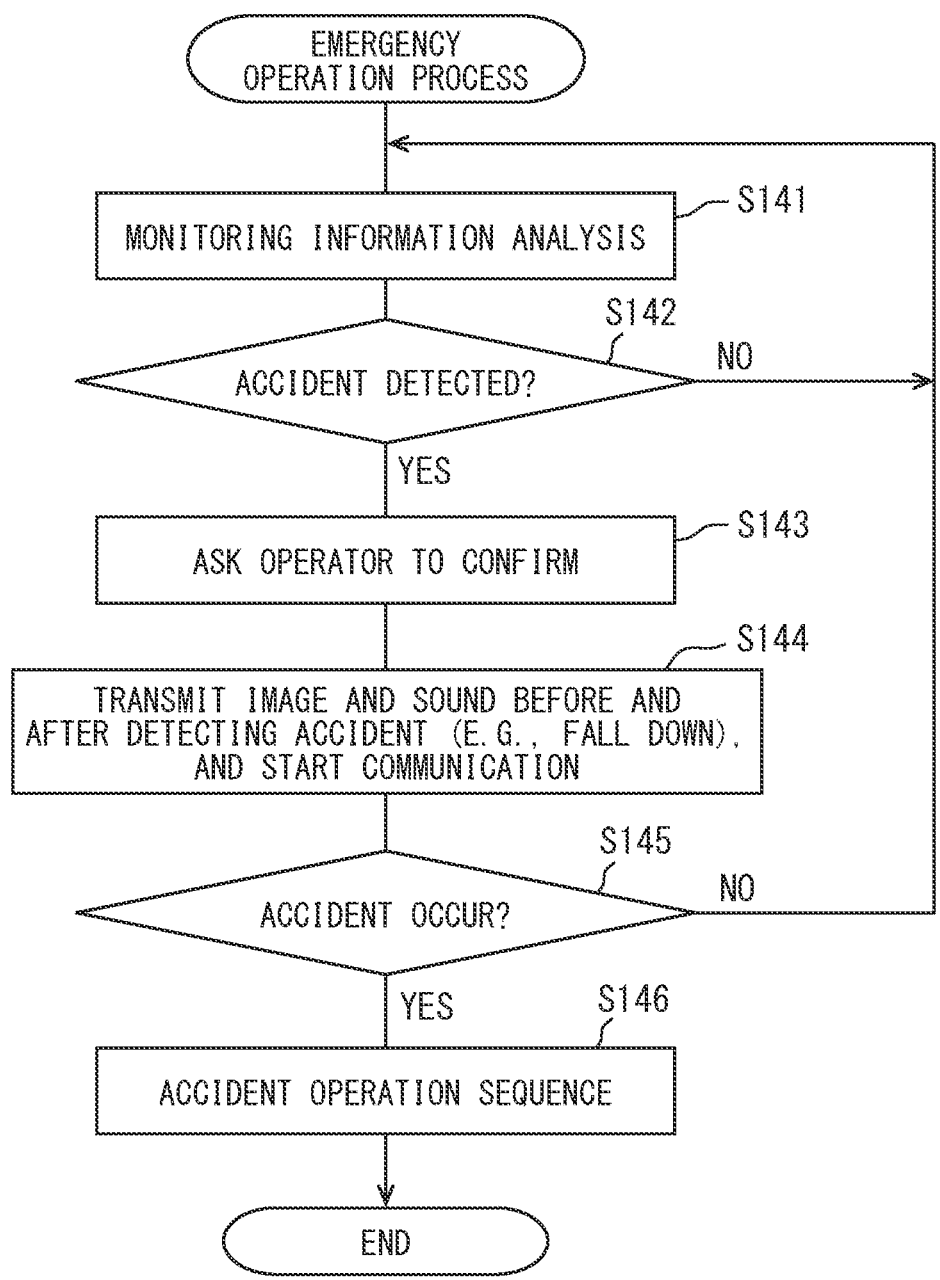
FIG. 6 is a flowchart showing a detail of an emergency operation process performed by the passenger compartment monitoring unit.

The emergency treatment process shown in FIG. 6 is a process for notifying the management center 92 of the situation of the passenger compartment C when the fall of the passenger P is detected and handling the situation. The emergency treatment process is started based on the activation of the traveling system of the vehicle ADV, and is continued until the traveling system is turned off.

In S141, the monitoring information such as the passenger compartment image and the passenger compartment sound is analyzed, and the process proceeds to S142. In S142, it is determined whether or not an abnormality is detected based on the analysis result of S141. By repeating steps S141 and S142, the monitoring state of the occurrence of an accident is maintained. Then, when the abnormality is detected, the process proceeds from S142 to S143.

In S143, a confirmation request is transmitted to the operator terminal 94 of the management center 92, and the process proceeds to S144. In S144, as information necessary for the operator to remotely confirm the situation, the passenger compartment image, the passenger compartment sound, and the like before and after the abnormality detection are transmitted to the operator terminal 94. In addition, in S144, a communication line is connected between the passenger compartment C and the operator terminal 94, and a communicable state between the passenger P and the operator is established, and the process proceeds to S145. The operator of the management center 92 may make an inquiry to a medical system DB such as a hospital, and determine the state of the passenger P in which the abnormality has occurred.

In S145, the result of the situation determination by the operator is acquired from the operator terminal 94. When the status determination result indicating that there is no abnormality is acquired in S145, the process returns to S141. On the other hand, when the situation determination result indicating that there is an abnormality is acquired in S145, the process proceeds to S146. In S146, as an abnormality treatment sequence, a report to the emergency center 99, a change of destination to the hospital, an arrangement of another vehicle on which another passenger P is to be boarded, and the like are performed, and the emergency treatment process is completed. Each action included in the anomaly treatment sequence of S146 may be automatically performed by the passenger compartment monitoring unit 100 or manually performed by the operator of the management center 92. Further, the rescuer involved in the operation management may rush to the vehicle ADV based on the operator's determination that the rescue is required.

In the first embodiment described so far, the attribute information of each passenger P is acquired, and the fall risk of each passenger P is determined based on the respective attribute information. Then, a high-risk passenger Pr with a high risk of falling down is individually grasped of the condition in the passenger compartment. Therefore, the travel restriction of the vehicle ADV can be appropriately controlled according to the actual fall risk of the high-risk passenger Pr on board. Based on the above, smooth operation of the vehicle is realized while avoiding the fall of passengers P with a high risk of falling. In other words, both the comfortable operation of the ADV vehicle and the smooth operation expected by the passengers P as ordinary persons can be realized.

In addition, the travel restriction of the first embodiment is continued until the high-risk person Pr is seated in the passenger seat. Therefore, high-risk persons Pr such as elderly people, pregnant women, and persons with reduced physical fitness can ride on the vehicle ADV with extra time without rushing to move. Therefore, it is possible to prevent from falling down since the passenger moves in a hurry. In this way, by limiting the start of the vehicle ADV while the high-risk person Pr moves, the fall risk of the high-risk person Pr is further effectively reduced.

On the other hand, even if an ordinary person with a low risk of falling is moving, the vehicle ADV may be allowed to start. In this way, when the target for which the running (or starting) of the vehicle is restricted is limited to the high-risk person Pr, the reduction of the fall risk and the smooth operation can be further compatible.

Further, in the first embodiment, a guidance sequence for guiding the high-risk person Pr to a vacant seat is carried out. Therefore, the high-risk person Pr can smoothly move to an empty seat after boarding the vehicle ADV. Based on the above, in order to reduce the risk of falling, the influence on the smooth operation of the vehicle ADV can be suppressed to a small extent even if consideration is given to waiting for the high-risk person Pr to sit down.

Further, in the first embodiment, when there are no vacant seats, guidance for promoting to give up priority seats is carried out. Therefore, a state in which a high-risk person Pr is seated is created with high certainty. Therefore, the fall risk of the high-risk person Pr can be further reduced.

In addition, in the first embodiment, a high-risk person Pr who stands up from the passenger seat before the vehicle stops is detected, and an actuation is carried out in which the high-risk person Pr who stands up is urged to sit down. According to the above, it becomes easy to maintain the state in which the high-risk person Pr is seated until the vehicle ADV stops. As a result, the risk of falling of the high-risk person Pr can be further reduced even during the braking period when the vehicle stops at a bus stop or the like.

Further, in the first embodiment, the presence or absence of the high-risk person Pr in the standing state is grasped before the start of the vehicle, and when there is a high-risk person in the standing state, the acceleration of the vehicle ADV is set lower after starting the vehicle than when there is no high-risk person Pr in the standing state. According to such driving restrictions, an increase in the risk of falling can be avoided even if all high-risk people Pr cannot be seated.

Further, the passenger compartment monitoring unit 100 permits the vehicle ADV to start after confirming that the high-risk person Pr grips the strap, the grip bar, and the like. Therefore, even if the high-risk person Pr is in a standing state, a fall at the time of starting is unlikely to occur.

In addition, in the first embodiment, the presence or absence of a high-risk person Pr in a standing state is grasped before the start of deceleration at a bus stop or the like. Then, when there is a high-risk person in a standing state, the deceleration that occurs is reduced by advancing the timing of starting deceleration as compared with the case where there is no high-risk person Pr in a standing state. According to such travel restrictions, an increase in the risk of falling due to braking can be appropriately avoided.

Further, in the first embodiment, when an incident or abnormality such as a falling-down occurs in the passenger P, the notification to the outside of the vehicle ADV is carried out. According to such an emergency treatment, even if the operation manager such as the driver is not on the vehicle ADV, the same effect as the driver watching the inside of the vehicle can be exhibited. Therefore, it is possible to reduce the anxiety of elderly people, pregnant women, people with low physical fitness, etc., who corresponds to the category of high-risk person Pr, with respect to the vehicle ADV, which is an unmanned bus. As a result, a universal mobility service that is easy to use even for vulnerable people can be realized.

In the first embodiment, the passenger condition grasping unit 72 corresponds to the "state grasping unit", and the passenger identification unit 50 and the passenger compartment monitoring unit 100 cooperate with each other to correspond to the "vehicle control system". The passenger identification unit 50 corresponds to the "computer", and the passenger compartment monitoring unit 100 corresponds to the "vehicle control device" and the "computer".

Second Embodiment

FIG. 7 illustrates a second embodiment of the present disclosure, which is an example of modification of the first embodiment. In the second embodiment, the autonomous driving of the vehicle ADV is remotely controlled by the operation management computer 200 installed in the management center 92. The operation management computer 200 cooperates with the passenger identification unit 50 and the passenger compartment monitoring unit 100 mounted on the vehicle ADV, and has substantially the same boarding start control (see FIG. 4) and deceleration/stopping control (see FIG. 5) and emergency treatment control (see FIG. 6) as in the first embodiment.

The passenger identification unit 50 has a fare collection unit 55 by executing an authentication program by the processor 51, and has a function of personally authenticating the passenger P. On the other hand, the passenger identification unit 50 of the second embodiment does not have a function of determining the characteristics of each passenger P.

The passenger compartment monitoring unit 100 executes a guidance control program stored in the memory device 63 via the processor 61, and has functional units such as a guidance control unit 74 and an external transfer unit 175. The guidance control unit 74 controls the implementation of announcements and the like to each passenger P including the high-risk person Pr, as in the first embodiment, based on the guidance command acquired from the operation management computer 200. The external transfer unit 175 cooperates with the external communication device 45 to transfer data such as passenger compartment image and passenger compartment sound necessary for grasping the passenger status and the passenger compartment situation toward the operation management computer 200.

The operation management computer 200 is installed in the management center 92, and is connected to each passenger compartment unit 100 of each vehicle ADV via the communication network NW. The operation management computer 200 is a computer mainly including a control circuit having a processor 261, a RAM 262, a memory device 263, and an input/output interface. The processor 261 is hardware for arithmetic processing with a large scale and connected to the RAM 262, and can execute various programs.

The memory device 263 includes a non-volatile storage medium, and stores various programs to be executed by the processor 261. The operation management computer 200 executes the remote vehicle control program stored in the memory device 263 by the processor 261. In addition to the attribute information acquisition unit 54, the characteristic storage database 56, the passenger condition grasping unit 72, the passenger compartment status grasping unit 73, the model generation unit 76, and the traveling restriction unit 77, which are substantially the same as those in the first embodiment, the operation management computer 200 provides the risk determination unit 257 and the guidance instruction unit 274. In the second embodiment, the operation management computer 200 has a function of determining the characteristics of each passenger P and a function of watching over the passenger P in the passenger compartment C and a function of remotely controlling the autonomous driving of the vehicle ADV.

Similar to the risk determination unit 57 (see FIG. 1) of the first embodiment, the risk determination unit 257 individually determines the fall risk of each passenger P based on the attribute information acquired by the attribute information acquisition unit 54. In addition, the risk determination unit 257 connects each passenger P extracted from the passenger compartment image transmitted to the operation management computer 200 to a determined fall risk, similar to the risk information acquisition unit 71 (see FIG. 1) of the first embodiment.

The guidance instruction unit 274 cooperates with the guidance control unit 74 of the passenger compartment monitoring unit 100 to provide the passenger P with guidance that reduces the risk of falling. The guidance instruction unit 274 changes the contents of the guidance command to be transmitted to the guidance control unit 74 according to the passenger status grasped by the passenger condition grasping unit 72 and the p situation grasped by the passenger compartment situation grasping unit 73. Under the control of the guidance instruction unit 274, in the passenger compartment C of the vehicle ADV, the guidance substantially the same as that of the first embodiment is performed for each passenger P.

In the second embodiment described so far, the travel restriction unit 77 of the operation management computer 200 outputs a travel restriction command to the automatic driving interface unit 40 through the communication network NW and the external communication device 45. As described above, it is possible to restrict the running of the vehicle ADV by remote control.

As described above, even the process of restricting the running of the vehicle ADV is executed in the management center 92, the running of the vehicle ADV can be appropriately controlled according to the actual fall risk of the high-risk person Pr. Therefore, the second embodiment also has the same effect as that of the first embodiment, and smooth operation is realized while avoiding the fall of the passenger P having a high risk of falling. In the second embodiment, the operation management computer 200 corresponds to the "computer" and the "vehicle control system".

Other Embodiment

Although a plurality of embodiments of the present disclosure have been described above, the present disclosure is not construed as being limited to the above-described embodiments, and can be applied to various embodiments and combinations within a scope that does not depart from the spirit of the present disclosure.

In the first modification of the first embodiment, as shown in FIG. 8, the process related to the characteristic determination of each passenger P is performed not by the passenger identification unit 50 but by the passenger compartment monitoring unit 100. The passenger identification unit 50 of the first modification mainly performs a payment process as in the second embodiment. The passenger compartment monitoring unit 100 has an attribute information acquisition unit 54, a characteristic storage database 56, and a risk determination unit 257 as functional units for determining passenger characteristics. In addition, the passenger compartment monitoring unit 100 includes a passenger condition grasping unit 72, an passenger compartment situation grasping unit 73, a guidance control unit 74, an external notification unit 75, a model generation unit 76, and a traveling restriction unit 77, which are substantially the same as those in the first embodiment.

As described above, even in the modified example 1 in which the functional units related to watching and driving restriction are integrated in the passenger compartment monitoring unit 100, the same effect as that of the first embodiment is obtained, and a smooth operation of the vehicle ADV in consideration of the high-risk person Pr is realized.

In the above embodiment, an announcement by voice message or the like is carried out in order to guide a high-risk person to a vacant seat. Alternatively, in consideration of the comfort of other passengers, voice guidance to vacant seats may not be performed. Alternatively, guidance to vacant seats may be carried out only when the passenger condition grasping unit detects a high-risk person who cannot find a vacant seat.

In the above embodiment, when there are priority seats and passenger seats occupied by luggage, a request is made to give up these seats. Alternatively, a request to give the general passenger seats, which are not priority seats, to high-risk persons may be positively implemented with respect to the ordinary passengers.

In the above embodiment, traveling restrictions are applied in both the scene of starting from the bus stop and the scene of decelerating toward the bus stop, reflecting the result of watching over the high-risk person. Alternatively, the traveling restriction in consideration of the high-risk person may be implemented only in one of the starting scene and the deceleration scene. Alternatively, in other driving scenes different from the starting scene and the deceleration scene, the traveling restriction reflecting the state of the high-risk person may be implemented. For example, in order to reduce the risk of falling due to sudden braking, the travel restriction unit may output the travel restriction command for lowering the maximum speed allowed during normal cruising when there are high-risk people in the standing state than when there are no high-risk people in the standing state.

Further, in the above embodiment, control for waiting for starting, control for accelerating the brake timing, control for limiting the generated acceleration to a low level, and the like are implemented as travel restrictions for avoiding a fall. Alternatively, the specific content of the driving restrictions enforced in each driving scene may be changed as appropriate. For example, the control of waiting for a start may be omitted, and traveling restrictions may be implemented so as to further reduce the acceleration during the movement of a high-risk person. Further, the travel restriction may be implemented based on the value of jerk calculated by differentiating the acceleration with respect to time. In addition, the specific stop location is not limited to the stop or the like.

In the above embodiment, the content that is difficult to judge by the system is notified to the operator outside the vehicle and dealt with by the operator's judgment. Alternatively, when the judgment of the monitoring system can be sufficiently secured, the notification procedure that seeks the judgment of the operator outside the vehicle may be omitted.

In the above embodiment, the configurations of the monitor, the speaker, and the like used for guiding passengers may be changed as appropriate. For example, frequent voice announcements tend to be annoying to many passengers. Therefore, by reproducing the voice message using the directional speaker, the voice announcement may be transmitted only to the high-risk person or other passengers to be guided. Furthermore, the passenger compartment communication device and each passenger's mobile terminal may be connected by wireless communication conforming to the Bluetooth (registered trademark) standard, and the guidance message may be transmitted only to the high-risk person or other passengers who are the target of guidance.

In the above embodiment, a mobile terminal, an IC card, or the like is used for personal authentication of passengers. Alternatively, the configuration for personal authentication may be changed as appropriate. For example, a wearable terminal may be used for personal authentication. Alternatively, the individual may be authenticated by fingerprint authentication using biometric information, face authentication, or the like.

In the above embodiment, the attribute information and the fall risk data are combined so as to quantify the fall risk, and passengers having a fall risk of a threshold value (e.g., level 5) or higher are selected as high-risk persons. Alternatively, the method of selecting high-risk persons may be changed as appropriate. For example, grouping of high-risk persons and ordinary passengers may be performed by AI processing that provides machine learning using past data that links attribute information and fall results, and applies attribute information to the judgment device generated by machine learning.

Further, the selection criteria for high-risk persons may be appropriately changed according to, for example, the area (country) where the vehicle is operated, the tendency of the user, the time zone, and the like. In addition, the items to be adopted as attribute information in the registered data may be changed as appropriate in consideration of the relevance to the fall risk.

In the above embodiment, the necessity of implementing the travel restriction is determined depending on whether or not a high-risk person selected based on the static fall risk estimated from the attribute information is in a standing state. Then, the restriction amount of the running restriction is adjusted by the process of further calculating the dynamic fall risk based on the change in the weight center of the high-risk person. Alternatively, the dynamic fall risk estimation may be omitted.

In the first embodiment, a travel restriction command is output from the passenger compartment monitoring unit to the automatic driving interface unit. On the other hand, in the second embodiment, a travel restriction command is output from the operation management computer to the automatic driving interface unit. As described above, the number of computers that output the driving restriction command to the automatic driving interface unit is not limited to one. Both the passenger compartment monitoring unit and the operation management computer may output a travel restriction command to the automatic driving interface unit. In this case, the travel restriction command of the passenger compartment monitoring unit may be prioritized, or the travel restriction command of the operation management computer may be prioritized. Alternatively, of the two travel restriction commands, the one with the larger restriction amount may be prioritized.

In the above embodiment, all passengers including high-risk passengers are monitored by the passenger compartment monitoring unit. Alternatively, only high-risk persons may be monitored, and other passengers (i.e., general people) may be excluded from monitoring. Further, when a plurality of high-risk passengers are on board, only the passenger with the highest falling-down risk value may be monitored.

In the above embodiment, an example in which the vehicle control method for realizing the monitoring system according to the present disclosure is applied to an unmanned bus has been described. Alternatively, the vehicle to which the vehicle control method of the present disclosure can be applied is not limited to an unmanned bus, and may be a manned vehicle. For example, the above vehicle control method may be applied to railway vehicles, articulated buses, etc., where it is difficult for the driver to monitor the entire passenger compartment. Furthermore, when the above vehicle control method is applied to a manned vehicle, an increase in the risk of falling due to carelessness of an inexperienced driver can be avoided.

As the computer that implements the vehicle control method of the present disclosure, a passenger authentication unit, a passenger compartment monitoring unit, an operation management computer, and the like have been exemplified in the above embodiment. Alternatively, the computer that implements the vehicle control method is not limited to these. For example, a plurality of on-board electronic control units and a computer in the center or the cloud may perform distributed processing of operations related to passenger watching over. Alternatively, the in-vehicle computer such as the automatic driving interface unit and the automatic driving control unit may process the calculation for realizing each function related to watching and running restriction alone or in a distributed manner.

As described above, each function provided by each control circuit of the in-vehicle computer and the operation management computer can be provided by software and hardware that executes the software, only software, only hardware, or a combination thereof. Further, when such a function is provided by an electronic circuit being hardware, each function can also be provided by a digital circuit including a large number of logic circuits or by an analog circuit.

The specific configuration of the processor that executes the data processing related to the vehicle control program and the instruction and the code can be changed as appropriate. The processor may include a GPU (Graphics Processing Unit) or the like, in addition to including a CPU (Central Processing Unit). Further, the processor may include an FPGA (Field-Programmable Gate Array) and an accelerator (for example, DSP (Digital Signal Processor)) specialized for learning and estimation of AI technology. In addition, the processor may be mounted on an FPGA, an ASIC (Application Specific Integrated Circuit), or the like.

Various non-transitory tangible storage medium (i.e., non-transitory tangible storage medium) such as a flash memory and a hard disk can be employed as the memory device for storing the vehicle control program and the like. The form of such a storage medium may be appropriately changed. For example, the storage medium may be in the form of a memory card or the like, inserted into a slot portion provided in the computer, and electrically connected to the control circuit. Further, the storage medium is not limited to the memory device of the in-vehicle device as described above, and may be an optical disk serving as a copy base of the program to the memory device, a hard disk drive of a general-purpose computer, or the like.

The control unit and the method thereof described in the present disclosure are realized by a dedicated computer provided by configuring a processor and a memory programmed to execute one or more functions embodied by a computer program may be done. Alternatively, the control unit and the method described in the present disclosure may be realized by a dedicated computer provided by configuring a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

Here, the flowchart described in this application or the process of the flowchart is composed of a plurality of sections (or referred to as steps), and each section is expressed as, for example, S101. Further, each section can be divided into multiple subsections, while multiple sections can be combined into one section. Furthermore, each section thus configured may be referred to as a device, module, or means.

Although the present disclosure has been described in accordance with the examples, it is understood that the present disclosure is not limited to such examples or structures. The present disclosure also includes various modifications and modifications within an equivalent range. In addition, various combinations and forms, and further, other combinations and forms including only one element, or more or less than these elements are also within the spirit and the scope of the present disclosure.

What is claimed is:

1. A vehicle control method executed by a computer to control a travelling operation of a vehicle,
the method causing at least one processor to:
acquire attribute information for each passenger boarding the vehicle;
determine a falling-down risk of each passenger individually based on the attribute information;
track a high-risk person determined to have a high falling-down risk in a passenger compartment of the vehicle;
grasp a condition of the high-risk person individually in the passenger compartment; and
restrict the travelling operation of the vehicle based on a dynamic falling-down risk which is determined according to a posture of the high-risk person in the condition of the high-risk person individually, wherein
the dynamic falling-down risk is determined based on whether a projected position at which a weight center of a body of the high-risk person is projected perpendicularly to a floor surface of the vehicle is disposed within space between both feet of the high-risk person.

2. The vehicle control method according to claim 1, wherein
the restricting of the traveling operation of the vehicle is continued until the high-risk person is seated in a passenger seat.

3. The vehicle control method according to claim 1, the method further causing the at least one processor to:
detect a vacant seat among a plurality of passenger seats arranged in the vehicle where a passenger is not seated when the high-risk person is disposed in the vehicle; and
guide the high-risk person to the vacant seat.

4. The vehicle control method according to claim 3, the method further causing the at least one processor to:
promote a passenger, who is seated in a predetermined priority seat, to give up the priority seat when no vacant seat is disposed in the vehicle; and
guide the high-risk person to a given up priority seat when the priority seat is given up.

5. The vehicle control method according to claim 1, the method further causing the at least one processor to:
detect the high-risk person who stands up from a passenger seat in a period before the vehicle decelerates to stop at a certain stop place; and
prompt the high-risk person, who stands up, to sit down.

6. The vehicle control method according to claim 1, the method further causing the at least one processor to:
   determine whether the high-risk person is in a standing state before starting the vehicle; and
   set an acceleration of the vehicle to be lower after starting the vehicle when the high-risk person is in the standing state than when no high-risk person is in the standing state.

7. The vehicle control method according to claim 1, the method further causing the at least one processor to:
   determine whether the high-risk person is in a standing state before stopping the vehicle; and
   advance a start timing of a brake for stopping the vehicle when the high-risk person is in the standing state earlier than when no high-risk person is in the standing state.

8. The vehicle control method according to claim 1, wherein:
   the vehicle control method is used in the vehicle that travels autonomously, the method further causing the at least one processor to:
   detect a passenger who falls down at least while the vehicle is running; and
   notify a situation in a passenger compartment of the vehicle to an external device of the vehicle when detecting the passenger who falls down.

9. The vehicle control method according to claim 1, wherein:
   for a state in which the projected position is out of the space between both feet, the high-risk person is determined to have a high-risk posture with a high dynamic fall risk.

10. A vehicle control system that controls a travelling operation of a vehicle, the vehicle control system comprising:
   an attribute information acquisition unit that acquires attribute information for each passenger boarding the vehicle;
   a risk determination unit that individually determines a falling-down risk of each passenger based on the attribute information;
   a condition grasping unit that tracks a high-risk person determined to have a high falling-down risk in a passenger compartment of the vehicle, and individually grasps a condition of the high-risk person in the passenger compartment; and
   a travel restriction unit that restricts the traveling operation of the vehicle based on a dynamic falling-down risk which is determined according to a posture of the high-risk person in the condition of the high-risk person individually, wherein
   the dynamic falling-down risk is determined based on whether a projected position at which a weight center of a body of the high-risk person is projected perpendicularly to a floor surface of the vehicle is disposed within space between both feet of the high-risk person.

11. A vehicle control device mounted on a vehicle that controls a travelling operation of the vehicle, the vehicle control device comprising:
   a risk information acquisition unit that acquires a determination result of individually determining a falling-down risk for each passenger boarding the vehicle;
   a condition grasping unit that tracks a high-risk person determined to have a high falling-down risk in a passenger compartment of the vehicle, and individually grasps a condition of the high-risk person in the passenger compartment; and
   a travel restriction unit that restricts the traveling operation of the vehicle based on a dynamic falling-down risk which is determined according to a posture of the high-risk person in the condition of the high-risk person individually, wherein
   the dynamic falling-down risk is determined based on whether a projected position at which a weight center of a body of the high-risk person is projected perpendicularly to a floor surface of the vehicle is disposed within space between both feet of the high-risk person.

12. A passenger watching-over method executed by a computer to watch over passengers boarding a vehicle, the method causing at least one processor to:
   acquire attribute information for each passenger;
   determine a falling-down risk of each passenger individually based on the attribute information;
   track a high-risk person determined to have a high falling-down risk in a passenger compartment of the vehicle;
   grasp a condition of the high-risk person individually in the passenger compartment; and
   determine a dynamic falling-down risk of the high-risk person based on a posture of the high-risk person in the condition of the high-risk person, wherein
   the dynamic falling-down risk is determined based on whether a projected position at which a weight center of a body of the high-risk person is projected perpendicularly to a floor surface of the vehicle is disposed within space between both feet of the high-risk person.

13. A passenger watching-over system that watches over passengers boarding a vehicle, the system comprising:
   an attribute information acquisition unit that acquires attribute information for each passenger;
   a risk determination unit that individually determines a falling-down risk of each passenger based on the attribute information;
   a condition grasping unit that tracks a high-risk person determined to have a high falling-down risk in a passenger compartment of the vehicle, and individually grasps a condition of the high-risk person in the passenger compartment; and
   a functional unit that determines a dynamic falling-down risk of the high-risk person based on a posture of the high-risk person in the condition of the high-risk person, wherein
   the dynamic falling-down risk is determined based on whether a projected position at which a weight center of a body of the high-risk person is projected perpendicularly to a floor surface of the vehicle is disposed within space between both feet of the high-risk person.

14. A passenger watching-over device mounted on a vehicle that watches over passengers boarding a vehicle, the device comprising:
   a risk information acquisition unit that acquires a determination result of individually determining a falling-down risk for each passenger boarding the vehicle;
   a condition grasping unit that tracks a high-risk person determined to have a high falling-down risk in a passenger compartment of the vehicle, and individually grasps a condition of the high-risk person in the passenger compartment; and
   a functional unit that determines a dynamic falling-down risk of the high-risk person based on a posture of the high-risk person in the condition of the high-risk person, wherein
   the dynamic falling-down risk is determined based on whether a projected position at which a weight center of a body of the high-risk person is projected perpendicularly to a floor surface of the vehicle is disposed within space between both feet of the high-risk person.

* * * * *